United States Patent [19]

Stewart

[11] Patent Number: 5,715,453
[45] Date of Patent: Feb. 3, 1998

[54] WEB SERVER MECHANISM FOR PROCESSING FUNCTION CALLS FOR DYNAMIC DATA QUERIES IN A WEB PAGE

[75] Inventor: Gordon Gregory Stewart, Byron, Minn.

[73] Assignee: International Business Machines Corporation, Armonk, N.Y.

[21] Appl. No.: 657,834

[22] Filed: May 31, 1996

[51] Int. Cl.$^6$ .................................................. G06F 17/30
[52] U.S. Cl. .................................... 395/615; 395/335
[58] Field of Search .................. 364/DIG. 1 MS File, 364/DIG. 2 MS File; 395/329, 330, 333, 334, 335, 339, 340, 348, 352, 353, 616, 611, 613, 615, 710, 793

[56] References Cited

U.S. PATENT DOCUMENTS 5,530,852 6/1996 Meske, Jr. et al. .................... 395/610
5,572,643 11/1996 Judson ................................... 395/793

OTHER PUBLICATIONS

Jason J. Manger "Netscape Navigator" (1995) pp. 160–168.

*Primary Examiner*—Robert B. Harrell
*Attorney, Agent, or Firm*—Schmeiser, Olsen, and Watts

[57] ABSTRACT

A web server computer system includes a transaction processor that reads a configuration file to determine how to handle incoming function calls to retrieve dynamic data by querying a data source. A number of language processors are provided for handling the possible different types of function calls that query dynamic data. When a function call within a web page corresponding to a query for dynamic data is encountered, the transaction processor determines from the configuration data which language processor will handle this specific function call, and passes the function call to the appropriate language processor. The language processor processes the function call, generates the appropriate query, obtains the dynamic data from the appropriate data source, and passes the data back to the transaction processor. The transaction processor then inserts the dynamic data into the web page to be sent to the requesting user.

33 Claims, 9 Drawing Sheets

WEB SERVER MECHANISM FOR PROCESSING FUNCTION CALLS FOR DYNAMIC DATA QUERIES IN A WEB PAGE

FIELD OF THE INVENTION

This invention generally relates to network servers, such as web servers on the Internet. More specifically, this invention relates to a mechanism for processing queries for dynamic data within a web page.

BACKGROUND OF THE INVENTION

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

One significant computer network that has recently become very popular is the Internet. The Internet grew out of this proliferation of computers and networks, and has evolved into a sophisticated worldwide network of computer systems. A user at an individual PC (i.e., workstation) that wishes to access the Internet typically does so using a software application known as a web browser. A web browser makes a connection via the Internet to other computers known as web servers, and receives information from the web servers that is displayed on the user's workstation. Information displayed to the user is typically organized into pages that are constructed using a specialized language called Hypertext Markup Language (HTML). The first web pages contained static data, meaning that the data on the page would be the same regardless of who accessed the page or when it was accessed. More recent web pages include dynamic data, which means that data on certain portions of the page is subject to change. One example of dynamic data is displaying stock market or other data that changes periodically. When accessing a page that includes dynamic data, the web server must know how and from what data source to retrieve the needed information for dynamic insertion into the HTML page.

Web servers that allow for dynamic data to be inserted into an HTML page typically have special software for processing the HTML page. The special software may be termed a "transaction processor", which processes an HTML page and handles special function calls or queries (i.e., transactions) that require dynamic data to be inserted into the page. These web servers typically have hard-coded transaction processors that detect a specific type of query for dynamic data within the HTML page data, and that perform the necessary accesses to a dedicated data source to retrieve the dynamic data. The retrieved data is then inserted into the HTML page, thereby allowing the dynamic data to be displayed to the user within the HTML page. If more than one data source is present, or if more than one type of data source is used, the web server must be manually reprogrammed to accommodate the specific number and types of data sources to be accessed.

As the number of Internet users, providers, and web servers continues to rapidly expand, it will become increasingly important for a web server to be able to accommodate new sources of dynamic data in an efficient manner. Without improvements in the manner dynamic data for HTML pages is processed, the adaptation of a web server to accommodate new data sources will continue to be an impediment to web server efficiency and performance.

SUMMARY OF THE INVENTION

A web server according to the present invention includes a transaction processor that reads a configuration file to determine how to handle incoming queries to dynamic data sources. A number of language processors are provided for handling the possible different types of queries for dynamic data. When a query within a web page is encountered, the transaction processor determines from the configuration data which language processor will handle this specific type of query, and passes the query to the appropriate language processor. The language processor processes the query, obtains the dynamic data from the appropriate data source, and passes the data back to the transaction processor. The transaction processor then inserts the dynamic data into the web page to be sent to the requesting user's web browser.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

DETAILED DESCRIPTION OF THE PREFERRED EMBODIMENT

Overview

The method and apparatus of the present invention has particular applicability to web servers on the Internet. For those individuals who are not familiar with the Internet, the world-wide web, web servers, and web browsers, a brief overview of these concepts is presented here.

Figure 2:
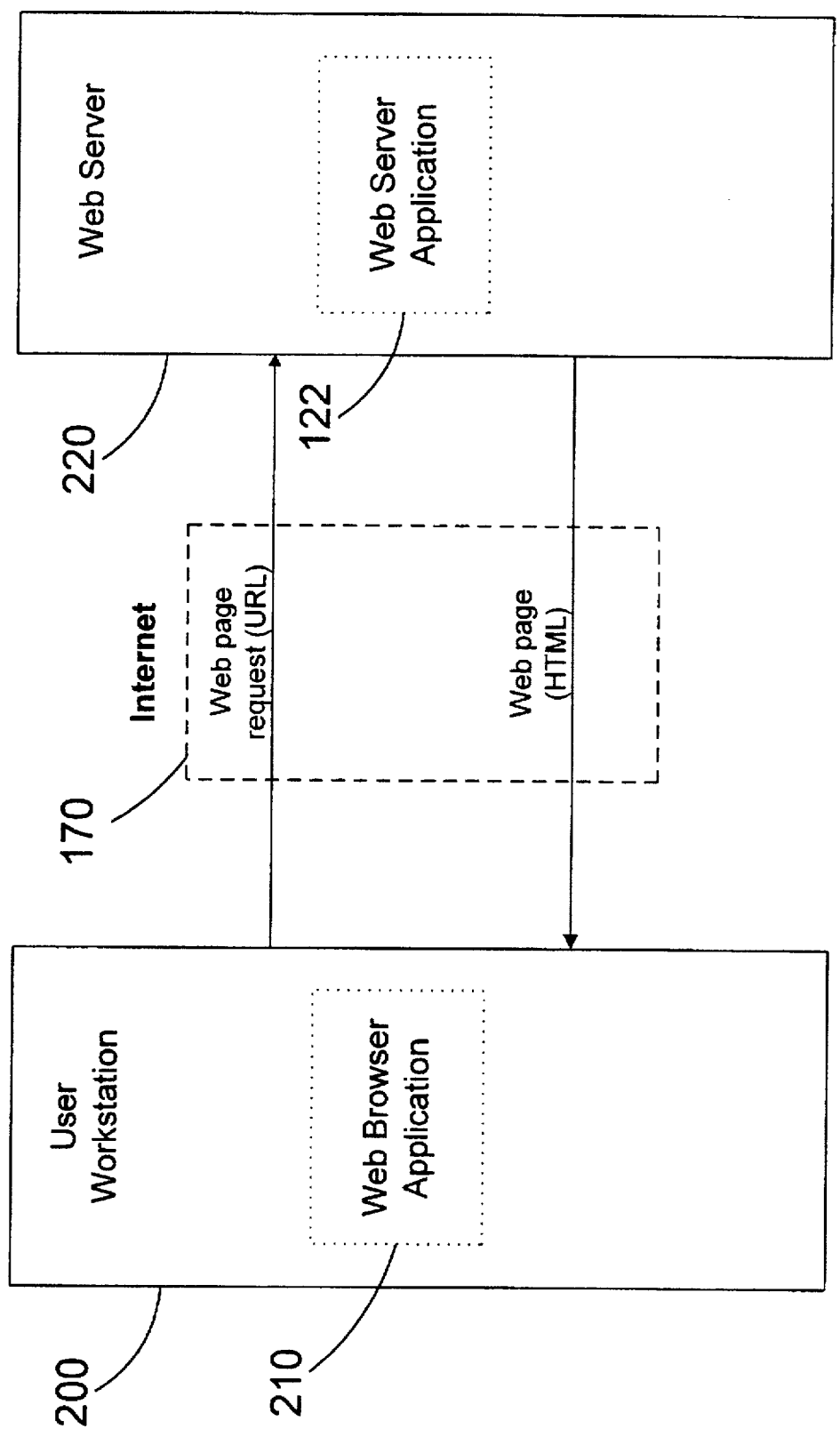
FIG. 2 is a block diagram of a typical Internet connection.

An example of a typical Internet connection is shown in FIG. 2. A user that wishes to access information on the Internet 170 typically has a computer workstation 200 that executes an application program known as a web browser 210. Under the control of web browser 210, workstation 200 sends a request for a web page over the Internet. Web page data can be in the form of text, graphics and other forms of information. Each web server on the Internet has a known address which the user must supply to the web browser in order to connect to the appropriate web server. Because web server 220 can contain more than one web page, the user will also specify in the address which particular web page he wants to view on web server 220. A web server computer system 220 executes a web server application 122, monitors requests, and services requests for which it has responsibility. When a request specifies web server 220, web server application 122 generally accesses a web page corresponding to the specific request, and transmits the page to the user's workstation 200.

Web Pages

A web page is primarily visual data that is intended to be displayed on the monitor of user workstation 200. Web pages are generally written in Hypertext Markup Language (HTML). When web server 220 receives a web page request, it will build a web page in HTML and send it off across the Internet 170 to the requesting web browser 210. Web browser 210 understands HTML and interprets it and outputs the web page to the monitor of user workstation 200. This web page displayed on the user's screen may contain text, graphics, and links (which are addresses of other web pages.) These other web pages (i.e., those represented by links) may be on the same or on different web servers. The user can go to these other web pages by clicking on these links using a mouse or other pointing device. This entire system of web pages with links to other web pages on other servers across the world is known as the "World Wide Web".

Static and Dynamic Data in Web Pages

As discussed in the Background section, when this web technology began, web pages contained only static data. For example, a web page displaying a company's balance sheet for a given quarter is static, meaning that the information is not going to change and can therefore be placed directly into the page. Later methods were developed to introduce dynamic data into web pages. For example, if a web page displaying current stock market activity is to be developed, then dynamic data showing current market figures must be incorporated. This dynamic data is generally available in a database or some other data source. The dynamic data is retrieved from the data source when the user requests the web page, thereby assuring that the dynamic data displayed on the requested web page is current.

The remainder of this specification describes how the present invention improves the flexibility and power of a web server by providing a simple way for allowing the web server to access dynamic data from new data sources. Those skilled in the art will appreciate that the present invention applies equally to any type of web server that accesses dynamic data for an HTML page, regardless of the specific configuration of the web server or the data source.

DETAILED DESCRIPTION

Figure 1:
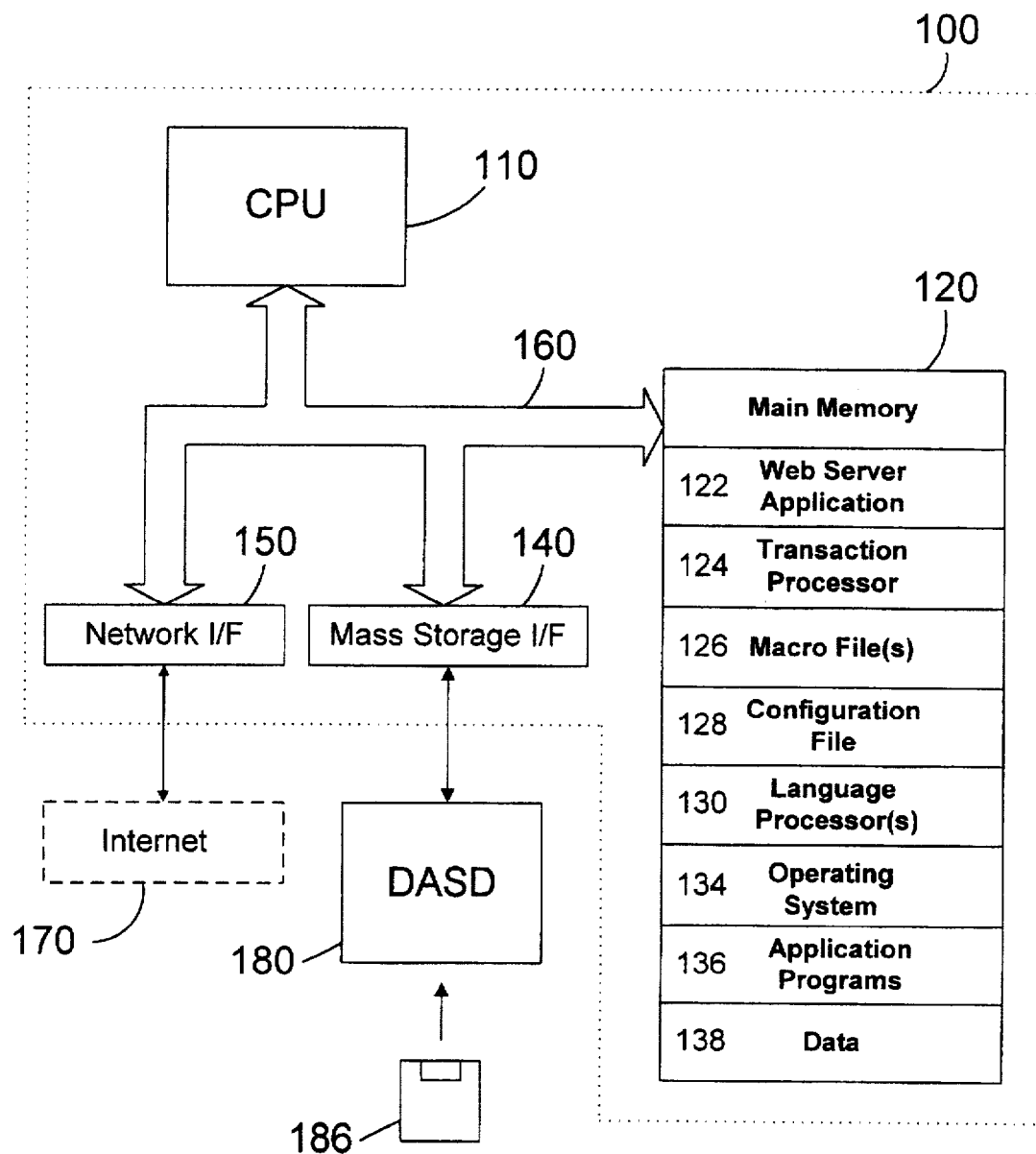
FIG. 1 is a block diagram of a web server computer system in accordance with the present invention.

Referring to FIG. 1, a computer system 100 in accordance with the present invention includes a central processing unit (CPU) 110, a main memory 120, a mass storage interface 140, and a network interface 150, all connected by a system bus 160. Those skilled in the art will appreciate that this system encompasses all types of computer systems: personal computers, midrange computers, mainframes, etc. Note that many additions, modifications, and deletions can be made to this computer system 100 within the scope of the invention. Examples of this are a computer monitor, input keyboard, cache memory, and peripheral devices such as printers. The present invention is operating as a web server, which is generally implemented with a personal or midrange computer.

CPU 110 can be constructed from one or more microprocessors and/or integrated circuits. CPU 110 executes program instructions stored in main memory 120. Main memory 120 stores programs and data that the computer may access. When computer system 100 starts up, CPU 110 initially executes the operating system 134 program instructions. Operating system 134 is a sophisticated program that manages the resources of the computer system 100. Some of these resources are the CPU 110, main memory 120, mass storage interface 140, network interface 150, and system bus 160.

Figure 7:
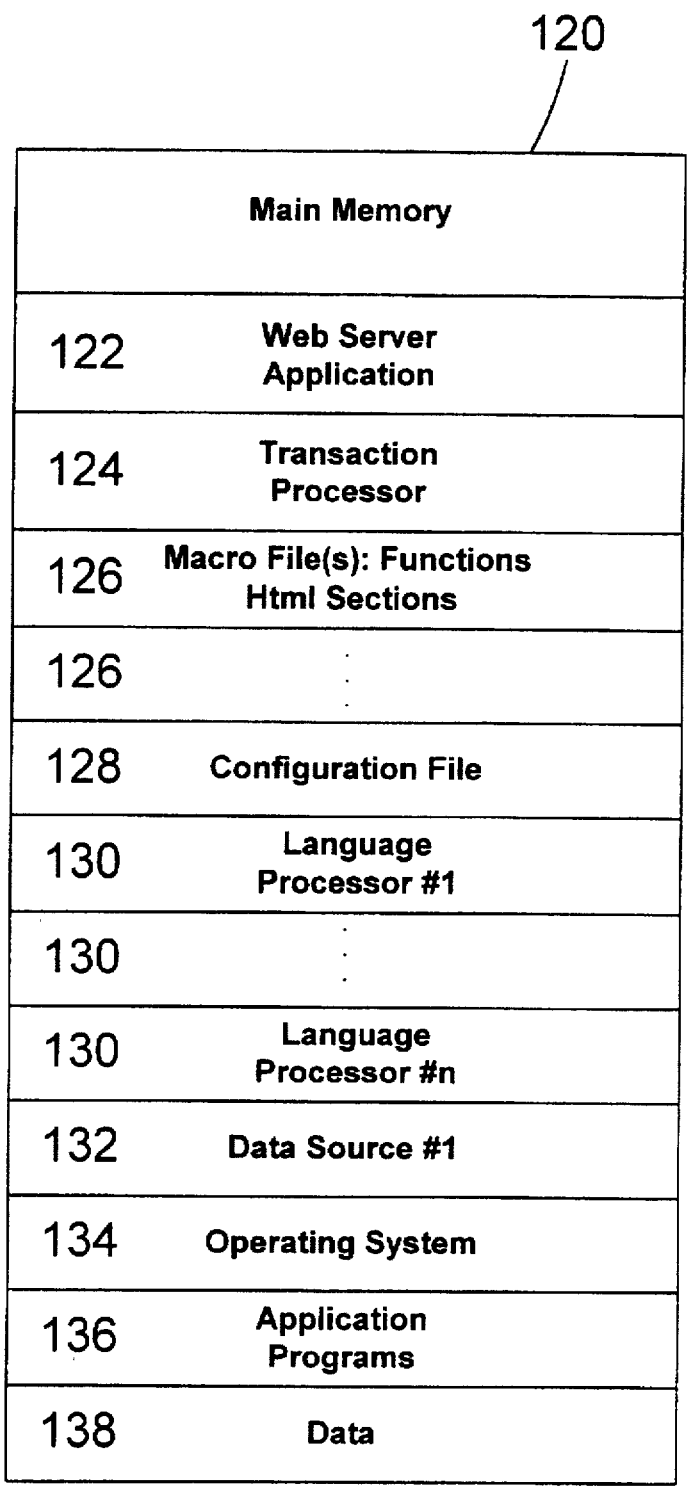
FIG. 7 is a block diagram of the contents of the main memory in the web server computer system of FIGS. 1 and 6.
Figure 8:
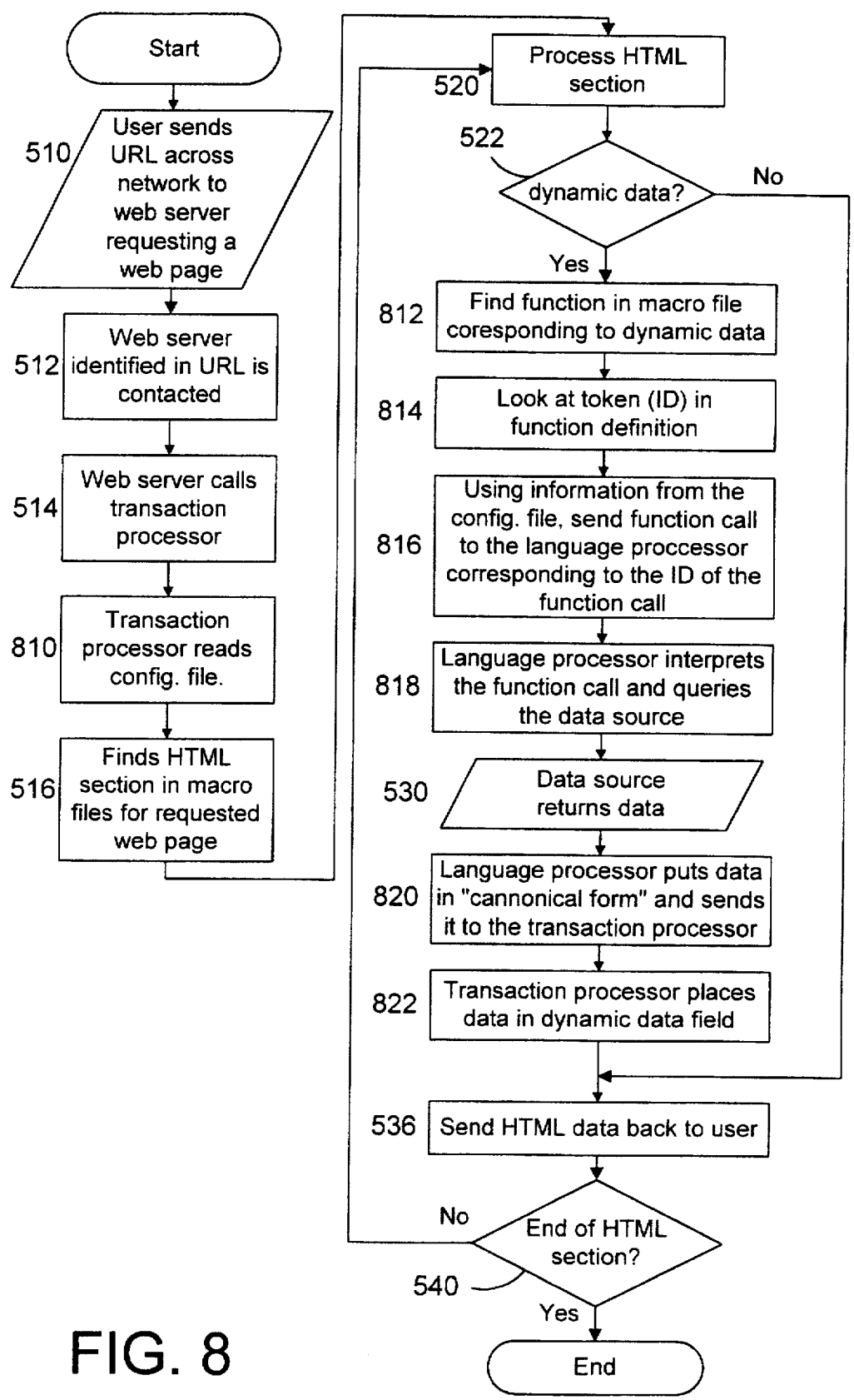
FIG. 8 is a flow diagram of the steps that are taken to use the web server mechanism of FIG. 6.

Referring to FIGS. 1 and 7, main memory 120 includes a web server application 122, a transaction processor 124, one or more macro files 126, a configuration file 128, one or more language processors 130, an operating system 134, one or more application programs 136, and program data 138. Application programs 136 are executed by CPU 110 under the control of operating system 134. Application programs 136 can be run with program data 138 as input. Application programs 136 can also output their results as program data 138 in main memory. In the present invention, a computer system 100 is operating as a web server, so CPU 110 executes, among other things, web server application 122. Transaction processor 124 is a program that processes an HTML page stored in one or more macro files 126. When transaction processor 124 is initialized, it reads configuration file 128 to correlate different types of queries to different language processors 130. When a query to dynamic data is found in a page, transaction processor 124 determines from the configuration data (read from the configuration file) which language processor 130 it should call to process the query. The appropriate language processor 130 then queries a data source, such as a memory or a database, to retrieve the dynamic data. Language processor 130 passes the dynamic data to transaction processor 124, which inserts the dynamic data into the HTML data for the selected page.

Mass storage interface 140 allows computer system 100 to retrieve and store data from auxiliary storage devices such as magnetic disks (hard disks, diskettes) and optical disks (CD-ROM). These mass storage devices are commonly known as Direct Access Storage Devices (DASD), and act as a permanent store of information. One suitable type of DASD is a floppy disk drive 180 that reads data from and writes data to a floppy diskette 186. The information from the DASD can be in many forms. Common forms are application programs and program data. Data retrieved through mass storage interface 140 is usually placed in main memory 120 where CPU 110 can process it.

While main memory 120 and DASD device 180 are typically separate storage devices, computer system 100 uses well known virtual addressing mechanisms that allow the programs of computer system 100 to behave as if they only have access to a large, single storage entity, instead of access to multiple, smaller storage entities (e.g., main memory 120 and DASD device 185). Therefore, while certain elements are shown to reside in main memory 120, those skilled in the art will recognize that these are not necessarily all completely contained in main memory 120 at the same time. It should be noted that the term "memory" is used herein to generically refer to the entire virtual memory of computer system 100.

Network interface 150 allows computer system 100 to send and receive data to and from any network the computer system may be connected to. This network may be a local area network (LAN), a wide area network (WAN), or more specifically the Internet 170. Suitable methods of connecting to the Internet include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

System bus 160 allows data to be transferred among the various components of computer system 100. Although computer system 100 is shown to contain only a single main CPU and a single system bus, those skilled in the art will appreciate that the present invention may be practiced using a computer system that has multiple CPUs and/or multiple buses. In addition, the interfaces that are used in the preferred embodiment may include separate, fully programmed microprocessors that are used to off-load compute-intensive processing from CPU 110, or may include I/O adapters to perform similar functions.

At this point, it is important to note that while the present invention has been (and will continue to be) described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks (e.g., 186 of FIG. 1) and CD ROM, and transmission type media such as digital and analog communications links.

The remainder of this specification will describe two different methods and associated computer systems for processing dynamic data in web pages. The first is a method that IBM developed using a program that runs on the web server called DB2WWW, Release 1, with respect to the configuration disclosed in FIGS. 3–5, and constitutes an alternative embodiment of the invention. The second method and the associated computer system is the preferred embodiment of the present invention as disclosed in FIGS. 6–9. Any of the programs executing on a web server to accomplish either of these implementations (e.g., transaction processors 124, 224 and language processors 130, 230) are referred to generically herein as web server programs.

In the present invention a computer system 100 is being operated as a web server. To do so, a web server application 122 is executed by CPU 110. Other application programs 136 may be run simultaneously on computer system 100 assuming that operating system 134 is a multi-tasking operating system. Web servers are generally connected to the Internet 170. As has been discussed, the Internet is a well known computer network that spans the world and is shared by millions of computers. There are many web servers on the Internet. Each computer linked to the Internet has its own unique address to enable it to communicate back and forth across the network with other computers. Many different types of data can be sent along the Internet. Examples are electronic mail, program data, digitized voice data, computer graphics, and web pages. The present invention extends to the transmission of any type of data that may have one or more components that are dynamically changed or updated prior to transmission to the user, but is described herein by way of illustration in the context of web pages that contain dynamic data.

Figure 3:
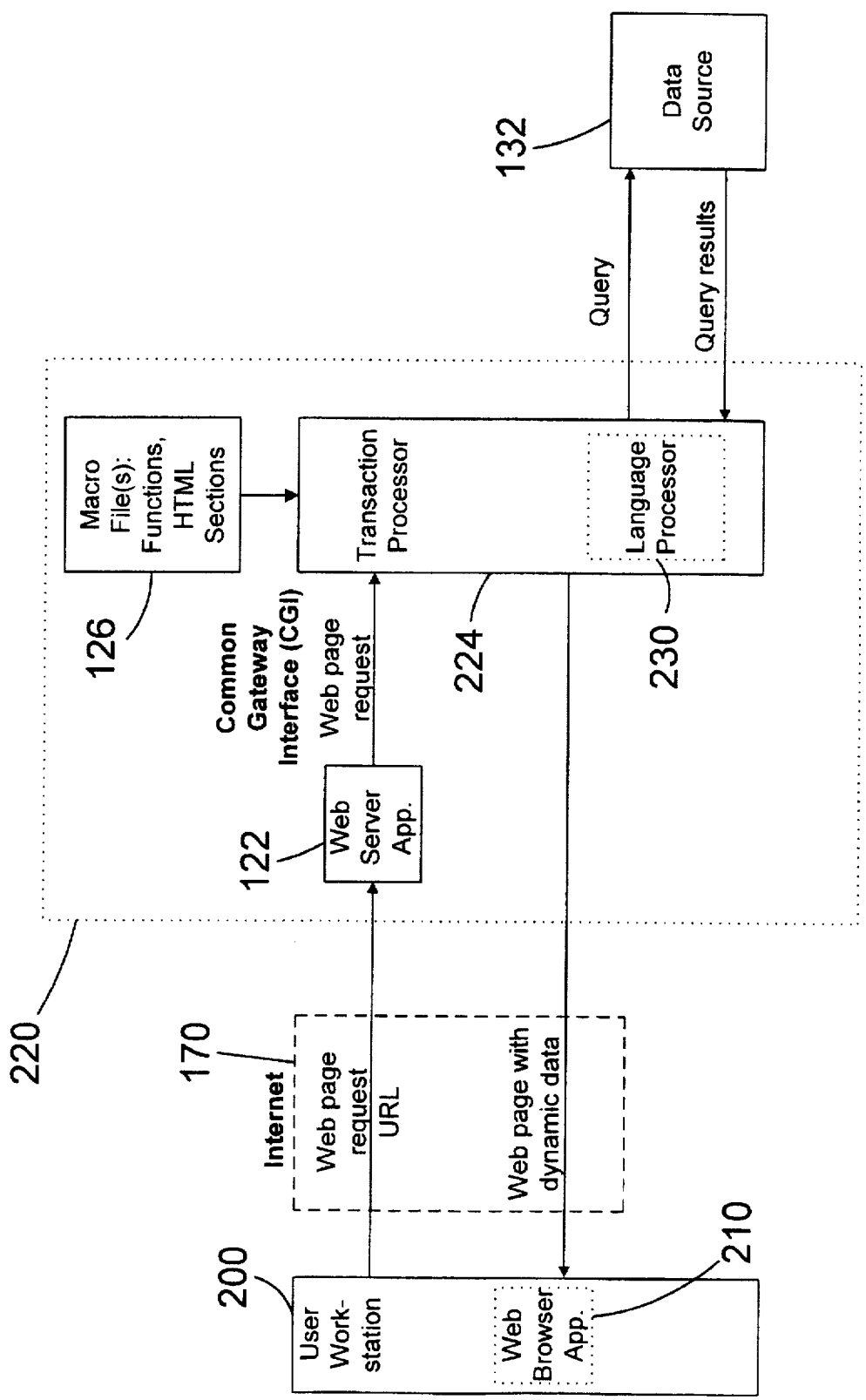
FIG. 3 is a block diagram of a web server mechanism that accommodates dynamic data in a web page.
Figure 4:
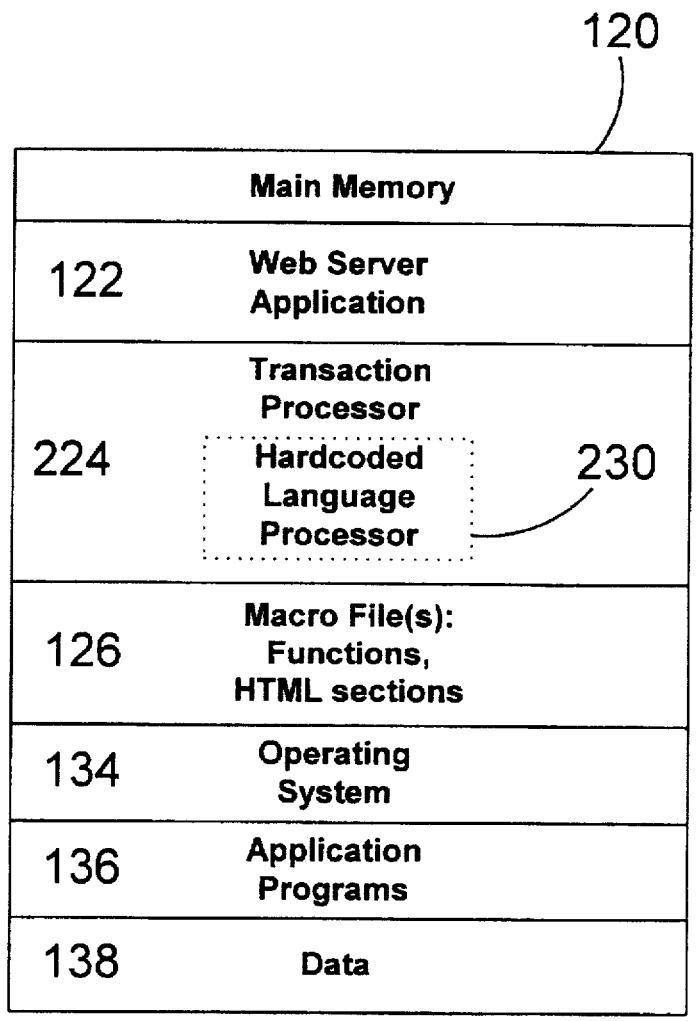
FIG. 4 is a block diagram of the contents of the main memory in the web server computer system of FIG. 3.
Figure 5:
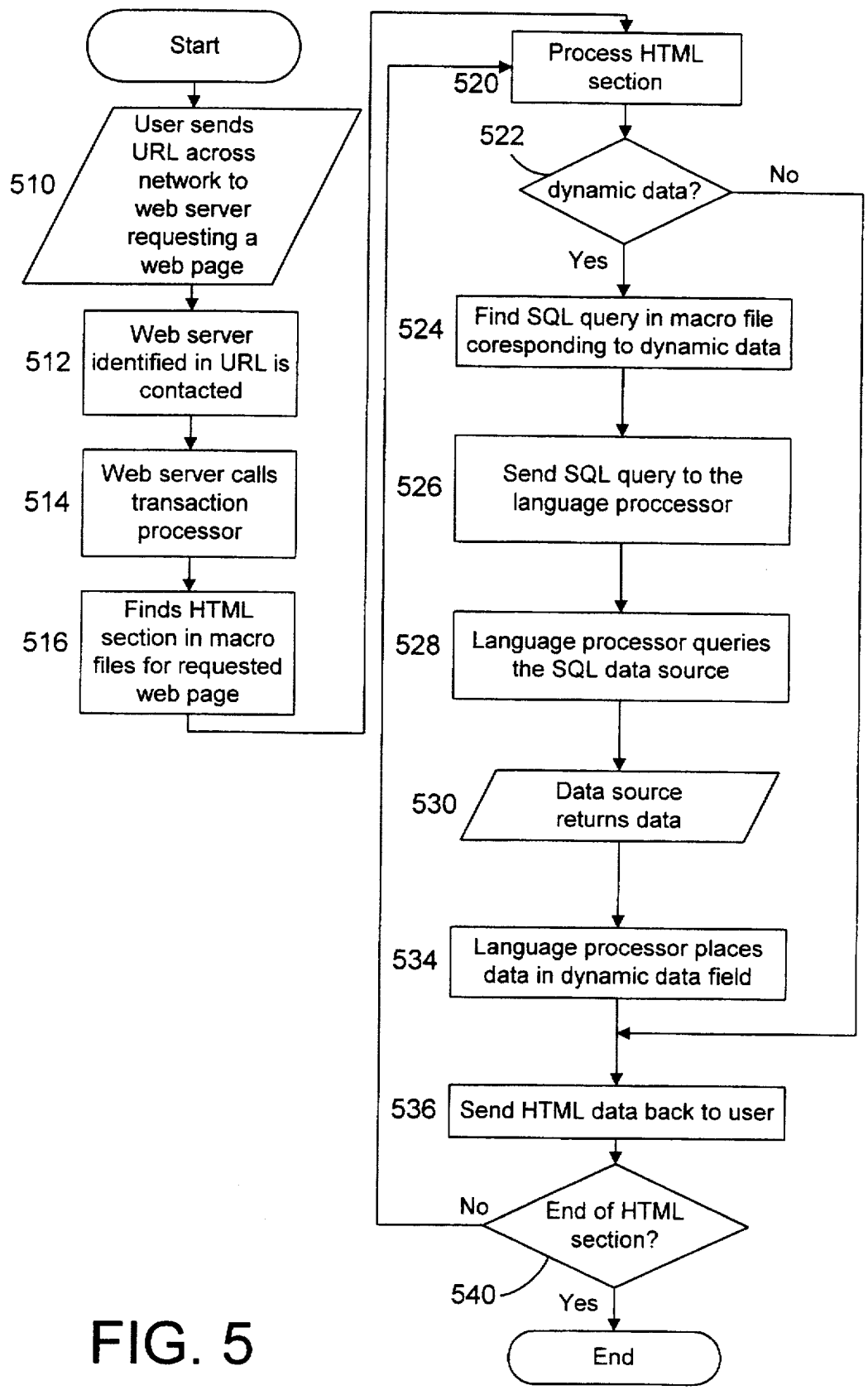
FIG. 5 is a flow diagram of the steps that are taken to use the web server mechanism of FIG. 3.

When dynamic data needs to be displayed on a web page, certain steps must be taken that are not required for static web pages. One particular implementation for handling dynamic data in web pages is illustrated in FIGS. 3 and 4, which illustrates an implementation developed at IBM. Web server 220 includes a web server application 122, one or more macro files 126, and a transaction processor 224 with a hard-coded language processor 230. Transaction processor 224 represents Release 1 of an IBM web server program known as DB2WWW. Release 1 was designed specifically to process SQL (Structured Query Language) database queries for dynamic data in web pages. SQL is a well known database format. The most salient portions of main memory for web server 220 are shown in FIG. 4. The operation of web server 220 may best be understood with reference to the flow diagram of FIG. 5.

A user at workstation 200 executes web browser application 210 to access the Internet 170. A user requests a web page by sending a Uniform Request Locator (URL) across the Internet 170 (step 510). URL is a well known protocol used to address resources on the World Wide Web. A URL contains the complete Internet address of a web server plus additional parameters which specify the desired web page. The following is an example of a URL that will be used to illustrate the function of the system of FIGS. 3 and 4:

http://www.abcxyz.com/cgi-bin/db2www.exe/wbp1.fil/2ndpage where:

http:// is the standard syntax to tell the web browser that what follows is a web page address.

www.abcxyz.com is the web server address.

/cgi-bin/db2www.exe tells the web server to execute and transfer control to program ctb2www.exe and pass any remaining part of the URL as parameters.

/cgi-bin refers to the Common Gateway Interface which is a well known web server interface that allows a web server application to invoke other programs to help with the processing of web page requests. In this example for Release 1 of DB2WWW, we assume that db2www.exe is the name of the transaction processor program that is executing on web server 220. In this context, /wbp1.fil/2ndpage are the parameters that are passed to transaction processor program db2www.exe. The transaction processor program will interpret the first parameter "wbp1.fil" as the macro file name and the second parameter "2ndpage" as the HTML section name within the macro file "wbp1.fil."

The user can send a URL by "clicking" with a mouse on a web page link, or the user can enter the entire URL address manually in the web browser. The URL is sent and travels across the Internet 170, contacting the web server 220 (as specified in the URL) (step 512).

When web server application 122 receives the URL from user workstation 200 that includes the cgi-bin parameter, web server application 122 calls transaction processor 224 and transfers control to it (step 514). Transaction processor 224 then processes the parameters passed to it (e.g., wbp1.fil and 2ndpage) to find the appropriate HTML section (2ndpage) in macro file 126 (wbp1.fil) that corresponds to the requested web page (step 516). Transaction processor 224 then begins processing the selected HTML section in macro file 126 to build the web page (step 520).

The next step is to determine whether the selected web page contains dynamic data. For Release 1 of DB2WWW, the presence of dynamic data is determined by scanning the HTML section for SQL queries for dynamic data. If an SQL query for dynamic data exists in the HTML section being processed (step 522=YES), then the SQL query is located (step 534), then passed to language processor 230 (step 526). Language processor 230 then queries data source 132 for the dynamic data (step 528). In response to the query, data source 230 returns the value for the dynamic data (step 530).

Language processor 230 then formats the dynamic data and places it into the appropriate field on the web page (step 534). The processed HTML data with the embedded dynamic data is then sent via the Internet 170 to the user that requested it (step 536). Any dynamic data fields on the web page will have been filled in with the latest values available to web server 220. The user's web browser 210 will receive the web page, interpret it, and display it on the user's monitor on user workstation 200. If the end of the HTML section is encountered (step 540=YES), the web page is done. If there is more of the HTML section to be processed (step 540=NO), the next portion of the HTML section is then processed (step 520), until the entire HTML page is transmitted to the user (step 536 and step 540=YES).

Transaction processor 224 is an application program that can be invoked by web server application 122 when it receives a request for a web page. The request is turned over to transaction processor 224. Transaction processor 224 can be created in different forms depending on the particular computing environment; some examples would be an executable program or a dynamic link library (DLL). Transaction processor 224 will look for the requested web page definition in macro file 126. If dynamic data is required to be put into the web page then a call is made to language processor 230. Language processor 230 is hard-coded as part of transaction processor 224.

Language processor 230 forms a query for dynamic data specific to data source 132. Language processor 230 is thus designed to process queries of a particular type, which are generally defined by the format (e.g., language) of the query. Data source 132 could be an SQL database, or some other environment where a program can be executed and data returned. Language processor 230 sends the query to data source 132. The results of the query (i.e., the dynamic data) are sent back to language processor 230. Language processor 230 extracts the dynamic data it needs, and places the data in the dynamic data field in the web page that transaction processor 224 is processing. This process of going out to data source 132 for dynamic data may occur several times for a single building of a web page, depending on how many dynamic data fields the web page contains. As the web page is processed, it is sent back across the network to the user's web browser 210 (step 536) which interprets it and displays it on the monitor of user workstation 200.

The language processor component 230 of transaction processor 224 is written (i.e., hard-coded) specifically to service queries for a particular data source 132 and in a particular data processing language (i.e., query type). The dynamic data that can be put in web pages is limited to the data source(s) 132 and the language that the hard-coded language processor 230 is programmed to understand. The present invention overcomes this problem of being constrained to a limited number and type of data sources and languages for dynamic data in web pages.

While web server 220 does provide a mechanism for accessing dynamic data from a data source and inserting the dynamic data into an HTML page, it retrieves the dynamic data using a hard-coded language processor 230 within transaction processor 224. This arrangement requires that the transaction processor 224 be modified if a new data source is identified as a source of dynamic data. If the new data source contains data in a different database format, language processor 230 must be modified to accommodate the new data source and the new format. A much better solution would allow the addition of new data sources and corresponding language processors without changing the transaction processor, which is the preferred embodiment of the present invention, as described below.

Figure 6:
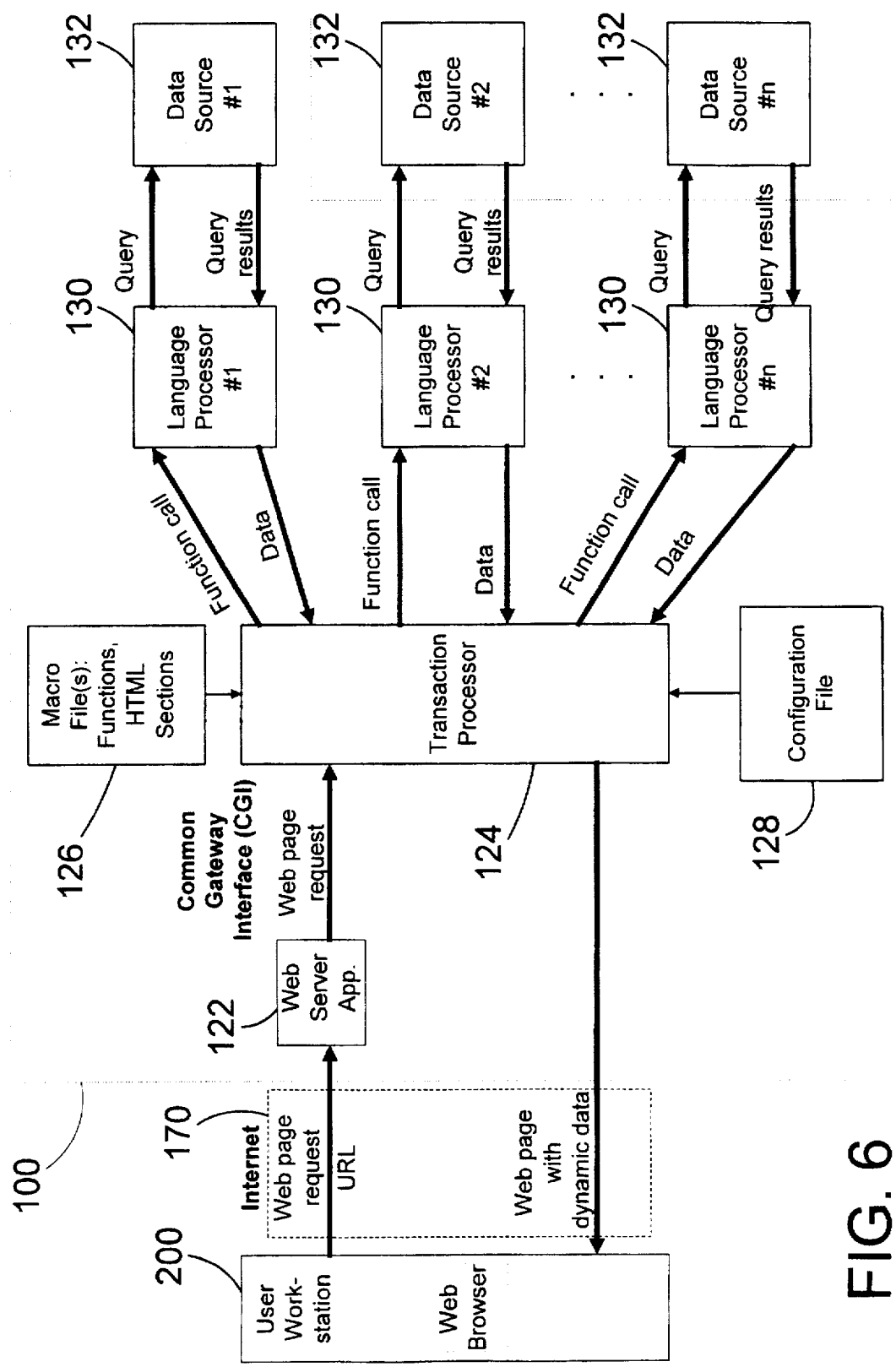
FIG. 6 is a block diagram of a web server mechanism according to the preferred embodiment.

Referring now to FIGS. 6 and 7, computer system 100 is configured as a web server in accordance with a preferred embodiment of the present invention. Web server 100 includes web server application 122, one or more macro files 126, a transaction processor 124, a configuration file 128, and multiple language processors 130 coupled to multiple data sources 132. The operational features of web server 100 may best be understood with reference to FIGS. 8 and 9.

The user first sends out a web page request by specifying a URL of the page (step 510). Assuming the same URL as before, namely http://www.abcxyz.com/cgi-bin/db2www.exe/wbp1.fil/2ndpage and assuming that web server 100 has an address of abcxyz.com, web server 100 is contacted (step 512). As shown in the sample URL above, if the web page request is for a page that contains dynamic data, the URL for the page will contain a special parameter such as a cgi-bin parameter, informing web server 100 that another program is needed to process the URL. When web server 100 sees the cgi-bin parameter in the URL, it calls transaction processor 124 by passing control to db2www.exe to handle the request (step 514), passing the macro file name "wbp1.fil" and HTML section name "2ndpage" as parameters. Note that db2www.exe in this URL represents the transaction processor 124 programmed in accordance with the preferred embodiment of the invention, and is therefore not the same program as Release 1 of DB2WWW described above.

Figure 9:
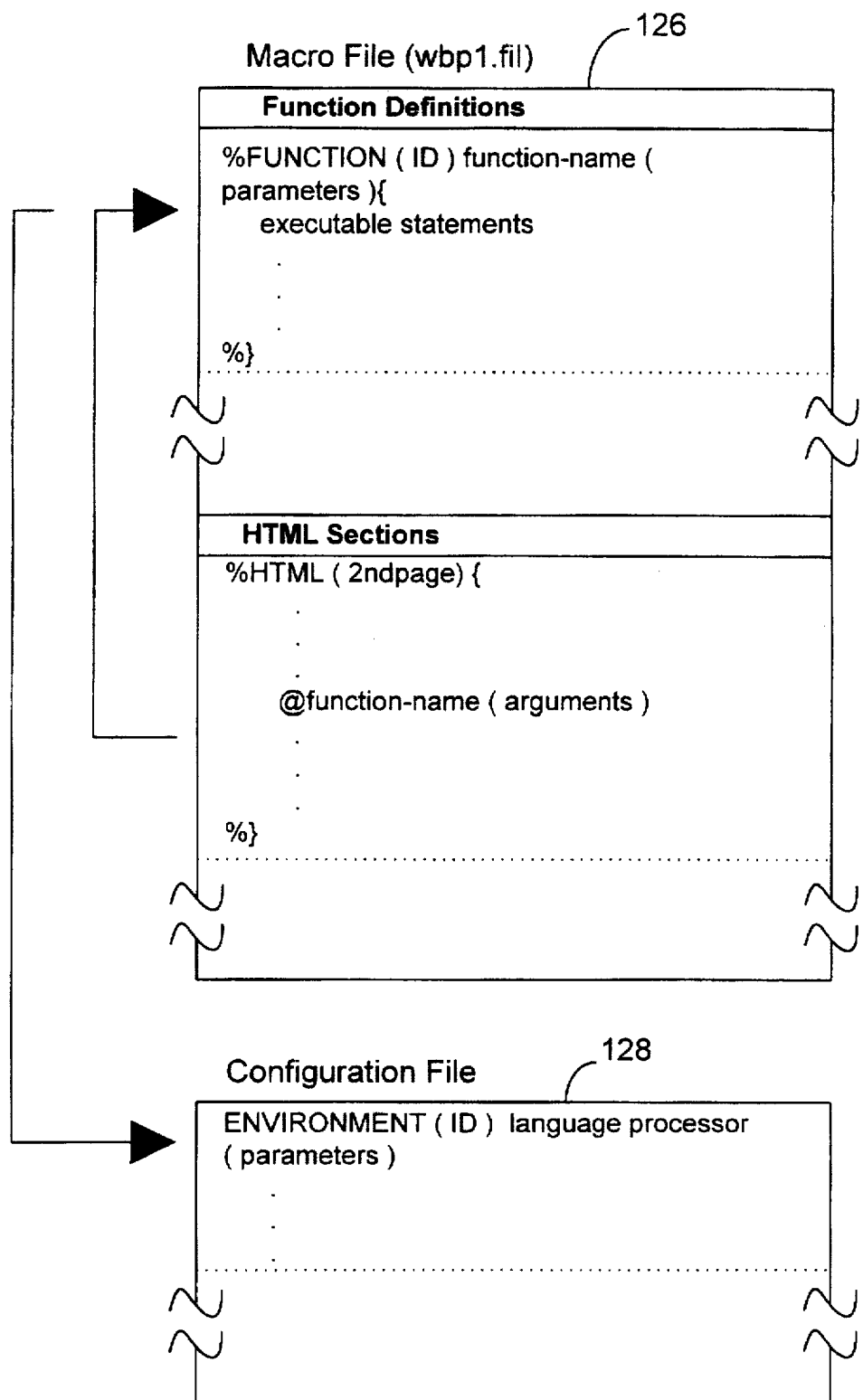
FIG. 9 is a block diagram showing some of the features of the macro file and configuration file of FIG. 6.

When transaction processor 124 is first initialized, it reads configuration file 128 (step 810). Referring now to FIG. 9, the configuration information within configuration file 128 informs transaction processor 124 of the language processors 130 available in the system to process different types of function calls, and correlates each function identifier (ID) to a language processor that is programmed to process that particular type of function. From the URL, web server 100 identifies the appropriate macro file (wbp1.fil) and finds the HTML section within macro file 126 that contains the desired web page (2ndpage) (step 516), and begins processing the HTML section (step 520). Transaction processor 124 then determines if the selected HTML section has a function call for dynamic data (step 522). If the desired web page has a function call for dynamic data (step 522=YES), then it uses the function name from the function call (e.g., function-name in FIG. 9) to find a function definition with the same name in the function definitions portion of macro file 126. Transaction processor 124 then obtains the special token or identifier (ID) from the function definition (step 814). The ID obtained from the function definition is matched with data previously read from configuration file 128 to determine which language processor should handle the function call, and the function call is passed to the appropriate language processor (step 816). In summary (referring to FIG. 9), when transaction processor 124 encounters a function (e.g., function-name) that requires the retrieval of dynamic data, it looks to the function definition portion of macro file 126 to find a token or identifier (ID) corresponding to the function-name. Transaction processor 124 then determines from the data previously read from configuration file 128 which language processor should process a function with that particular ID.

Referring again to FIG. 8, language processor 130 then generates from the function call a query to its corresponding data source 132 (step 818), and the data source returns the requested data to language processor 130 (step 530). The selected language processor will put the dynamic data in a form transaction processor 124 will understand, and will then pass the data to transaction processor 124 (step 820). Transaction processor 124 then places the dynamic data in the appropriate field of the HTML page (step 822). This portion of the HTML page is then sent back to the user (step 536) and is displayed to the user on the monitor attached to user workstation 200.

Note that detecting the presence of dynamic data in a web page by detecting certain types of function calls is only one of many ways to determine whether the selected page includes dynamic data. The correlation between a function call and dynamic data is used herein for the sake of clearly explaining the operation of the preferred embodiment, and should not be construed as limiting. Any form of indicia indicating that dynamic data is required in the page falls within the scope of the present invention.

With the configuration of the preferred embodiment, language processors 130 are now separate from transaction processor 124. In the preferred embodiment, each language processor 130 is written to communicate with a specific data source 132, recognizing that in alternative embodiments two or more language processor may access a single data source or that one language processor may access multiple data sources. Language processor 130 can exist as a DLL or some type of shared library, with the exact implementation depending on the operating system and the web server interface. Note that data sources 132 can exist within web server 100 (as shown for Data Source #1 in FIG. 6), or they can be located across a network on another computer (as shown for Data Sources #2 and #3).

With the mechanism disclosed herein, new data sources 132 and/or language processors 130 may be added to the system when new types or sources of dynamic data need to be added to web pages stored in one or more macro files 126. To add a new data source, a language processor 130 must be programmed to communicate with the new data source 132. In the preferred scenario, each data source of a particular type will have a dedicated language processor that is programmed to interpret function calls, including queries, to a data source 132. In this scenario, the addition of a new type of query requires the addition of a new language processor 130 to recognize the query, along with the addition of a new data source 132. Of course, one skilled in the art will appreciate that one language processor may be programmed to interpret any number of different types of queries to any number and configuration of data sources. Language processors 130 disclosed herein are shown separate in the figures for the purpose of illustrating that each language processor 130 processes different types of queries.

After a new language processor 130 is loaded, the configuration file 128 must be updated to list the identifiers (IDs) of functions that the new language processor 130 may process, particularly in light of its corresponding new data source 132. HTML sections in the macro files 126 will be updated to reflect the new dynamic data in the web pages. New functions may be added to the macro files 126 to access the new data sources 132. Data sources 132 and language processors 130 can also be dropped from the system, as needed. By separating out the language processors 130 from transaction processor 124, and by providing a configuration file 128 that provides a mapping between certain types of dynamic queries and the specific language processor 130 that will handle each type of query, web server 100 provides a type of framework mechanism for easily adding dynamic data sources 132 and language processors 130 to support new queries to these new data sources without changing transaction processor 124.

Note that this invention of integrating multiple data sources into a web server can be implemented even if the Common Gateway Interface is not used to invoke the transaction processor. One skilled in the art can see that other mechanisms could be used to invoke this transaction processor. For example, it could be written as a "shared library" that is always loaded on the computer system, with the different web page requests making calls to it simultaneously.

While the invention has been particularly shown and described with reference to preferred exemplary embodiments thereof, it will be understood by those skilled in the art that various changes in form and details may be made therein without departing from the spirit and scope of the invention. For example, while the preferred embodiments herein are discussed in terms of HTML pages, other page formats and data formats are equally encompassed by the present invention. The term page as used herein is intended to encompass any type of data processing that requires insertion of dynamic data into the data prior to transmission, whether the data transmission results in a page being displayed to the user or not.

I claim:

1. A web server computer apparatus comprising:
   a central processing unit;
   a memory coupled to the central processing unit, the memory including:
      a plurality of pages, the plurality of pages including indicia of dynamic data to be retrieved from a plurality of data sources for insertion into at least one of the plurality of pages; and
      at least one web server program, the web server program processing the indicia to retrieve the dynamic data from the plurality of data sources.

2. The computer apparatus of claim 1 further comprising:
   a plurality of language processors, each language processor being coupled to at least one of the plurality of data sources, the language processor processing the indicia to retrieve the dynamic data from the corresponding data source;
   a configuration file containing configuration data for indicating the correspondence between the indicia and the plurality of language processors;
   at least one transaction processor, the transaction processor reading the configuration file and processing a selected one of the plurality of pages according to the configuration data, the transaction processor receiving from the corresponding language processor the dynamic data and placing the dynamic data within the data for the selected page.

3. The computer apparatus of claim 2 wherein the selected page is selected using a Uniform Resource Locator (URL).

4. The computer apparatus of claim 2 wherein the selected page is a hypertext markup language (HTML) page.

5. A program product comprising:
   (A) a web server program, the web server program including:
      a plurality of pages, the plurality of pages including indicia of dynamic data to be retrieved from a plurality of data sources for insertion into at least one of the plurality of pages; and
      at least one web server program, the web server program processing the indicia to retrieve the dynamic data from the plurality of data sources.

6. The program product of claim 5 further comprising:

a plurality of language processors, each language processor being coupled to at least one of the plurality of data sources, the language processor processing the indicia and formulating therefrom at least one query to retrieve the dynamic data from the corresponding data source;

a configuration file containing configuration data for indicating the correspondence between the indicia and the plurality of language processors;

at least one transaction processor, the transaction processor reading the configuration file and processing a selected one of the plurality of pages according to the configuration data, the transaction processor receiving from the corresponding language processor the dynamic data and placing the dynamic data within the data for the selected page.

7. The program product of claim 6 wherein the selected page is selected using a Uniform Resource Locator (URL).

8. The program product of claim 6 wherein the selected page is a hypertext markup language (HTML) page.

9. The program product of claim 5 wherein the signal bearing media comprises recordable media.

10. The program product of claim 5 wherein the signal bearing media comprises transmission media.

11. A web server computer apparatus comprising:

a central processing unit;

a memory coupled to the central processing unit, the memory including:

at least one macro file containing data for a plurality of pages, at least one of the plurality of pages including at least one function call to retrieve dynamic data from at least one data source;

at least one language processor coupled to the at least one data source, the language processor processing the at least one function call to retrieve the dynamic data from the at least one data source;

a configuration file containing configuration data for indicating the correspondence between the at least one function call and the at least one language processor;

at least one transaction processor, the transaction processor reading the configuration file and processing the data in the macro file corresponding to a selected one of the plurality of pages according to the configuration data, the transaction processor receiving from the language processor the dynamic data and placing the dynamic data within the data for the selected page.

12. The computer apparatus of claim 11 further comprising a plurality of language processors and a plurality of data sources, wherein each language processor processes the at least one function call for the dynamic data that resides in at least one data source.

13. The computer apparatus of claim 12 wherein the function call identifies a need for dynamic data.

14. The computer apparatus of claim 12 wherein the selected page is selected using a Uniform Resource Locator (URL).

15. The computer apparatus of claim 12 wherein the selected page is a hypertext markup language (HTML) page.

16. A program product comprising:

(A) a web server program, the web server program including:

(1) at least one macro file containing data for a plurality of hypertext markup language (HTML) pages, at least one of the plurality of pages including at least one function call to retrieve dynamic data from at least one data source;

(2) at least one language processor coupled to the at least one data source, the language processor processing the at least one function call to retrieve the dynamic data from the at least one data source; and (3) a configuration file containing configuration data for indicating the correspondence between the at least one function call and the at least one language processor; and (4) at least one transaction processor, the transaction processor reading the configuration file and processing the data in the macro file corresponding to a selected one of the plurality of pages according to the configuration data, the transaction processor receiving from the language processor the dynamic data and placing the dynamic data within the data for the selected page;

and (B) signal bearing media bearing the web server program.

17. The program product of claim 16 wherein the signal bearing media comprises recordable media.

18. The program product of claim 16 wherein the signal bearing media comprises transmission media.

19. The program product of claim 16 wherein the selected page is a hypertext markup language (HTML) page.

20. A computer-implemented method for processing at least one request for at least one page, the method including the steps of:

providing a plurality of pages, the pages including indicia of dynamic data to be retrieved from a plurality of data sources for insertion into at least one of the plurality of pages;

the request selecting at least one page to be processed;

providing a web server program in a memory of a web server computer apparatus, the web server computer apparatus executing the web server program, and in response thereto, performing the steps of:

determining which of the plurality of pages is the selected page;

processing any indicia within the selected page to retrieve the dynamic data from the plurality of data sources; and inserting the dynamic data into the selected page.

21. The computer-implemented method of claim 20 wherein the selected page is a hypertext markup language (HTML) page.

22. The computer-implemented method of claim 20 wherein the request comprises a Uniform Resource Locator (URL).

23. A computer-implemented method for processing at least one request for at least one page, the method including the steps of:

providing at least one language processor capable of processing queries in a particular language;

providing at least one data source coupled to the at least one language processor, each data source corresponding to at least one language processor;

determining a plurality of function calls corresponding to each language processor;

the request selecting at least one page to be processed;

determining if the selected page contains at least one of the plurality of function calls corresponding to dynamic data;

if the selected page contains a function call corresponding to dynamic data, performing the steps of:

a selected language processor corresponding to the function call processing the function call to generate a query to retrieve the dynamic data from the at least one data source that corresponds to the selected language processor; and inserting the dynamic data into the selected page.

24. The computer-implemented method of claim 23 further comprising the step of sending the selected page containing the dynamic data to a user that performed the step of selecting the at least one page to be processed by providing a Uniform Resource Locator (URL).

25. The computer-implemented method of claim 23 wherein each function call corresponds to at least one of the language processors.

26. The computer-implemented method of claim 23 wherein the step of determining the plurality of function calls for each language processor includes the step of reading a configuration file that contains configuration data that correlates each language processor to a plurality of the function calls.

27. The computer-implemented method of claim 23 wherein the selected page is a hypertext markup language (HTML) page.

28. The computer-implemented method of claim 23 wherein the request comprises a Uniform Resource Locator (URL).

29. A program product comprising:

(A) a web server program, the web server program including:

(1) at least one macro file containing data for a plurality of hypertext markup language (HTML) pages, at least one of the plurality of HTML pages including at least one function call to retrieve dynamic data from a plurality of data sources;

(2) a plurality of language processors coupled to the plurality of data sources, the language processor processing the at least one function call to retrieve the dynamic data from the corresponding data source;

(3) a configuration file containing configuration data for indicating the correspondence between the at least one function call and the at least one language processor; and (4) at least one transaction processor, the transaction processor reading the configuration file and processing the data in the macro file corresponding to a selected one of the plurality of HTML pages according to the configuration data, the transaction processor receiving from at least one of the plurality of language processors the dynamic data and placing the dynamic data within the data for the selected HTML page;

and (B) signal bearing media bearing the web server program.

30. The program product of claim 29 wherein the signal bearing media comprises recordable media.

31. The program product of claim 29 wherein the signal bearing media comprises transmission media.

32. A computer-implemented method for displaying a selected hypertext markup language (HTML) page on a user workstation, the method including the steps of:

providing the user workstation executing a web browser application;

providing a web server computer executing a web server application, the web server computer including:

a central processing unit;

a memory coupled to the central processing unit, the memory including:

at least one macro file containing data for a plurality of HTML pages, at least one of the plurality of HTML pages including at least one function call to retrieve dynamic data from at least one data source;

at least one language processor coupled to the at least one data source, the language processor processing the at least one function call to retrieve the dynamic data from the corresponding data source;

a configuration file containing configuration data for indicating the correspondence between the at least one function call and the at least one language processor;

at least one transaction processor, the transaction processor reading the configuration file and processing the data in the macro file corresponding to a selected one of the plurality of HTML pages according to the configuration data, the transaction processor receiving from the language processor the dynamic data and placing the dynamic data within the data for the selected HTML page;

the transaction processor reading the configuration file;

determining the correspondence between each function call and each language processor;

determining if the selected HTML page contains at least one function call for dynamic data;

if the selected HTML page contains the at least one function call for dynamic data, performing the steps of:

a selected language processor corresponding to the function call processing the function call to generate a query to retrieve the dynamic data from the at least one data source that corresponds to the selected language processor;

transferring the dynamic data from the selected language processor to the transaction processor;

the transaction processor inserting the dynamic data into the selected HTML page; and the web server computer sending the selected HTML page containing the dynamic data to the user workstation.

33. The computer-implemented method of claim 32 wherein the request comprises a Uniform Resource Locator (URL).

* * * * *